UNITED STATES PATENT OFFICE 2,573,957

PROCESS FOR TREATING NONFIBROUS CELLULOSE FILM AND RESULTING PRODUCT

John Harold Daniel, Jr., Cos Cob, and Chester Grey Landes, New Canaan, Conn., and John Davis Pollard, Baltimore, Md., assignors to American Cyanamid Company, New York, N. Y., a corporation of Maine No Drawing. Application June 28, 1949, Serial No. 101,916

15 Claims. (Cl. 117—76)

This invention relates to a process for treating non-fibrous cellulose films in order to improve the bonding of the subsequently-applied topcoats thereto. More specifically, this invention relates to a process of treating non-fibrous, regenerated cellulose film with an ammonia polyfunctional halohydrin resin in aqueous dispersion in a softening bath, removing the film from the bath, drying the film, curing the affixed resin, and applying the topcoat thereto.

The object of the present invention is to improve the bonding of topcoats to the regenerated cellulose films in order that their application and use commercially can be expanded to fields other than those already tried and to those applications which, having been tried, have not proved to be successful. A further object of the present invention is to improve the bonding of the topcoat to the regenerated cellulose films to such a degree that water immersion for prolonged periods does not materially affect said bonding nor does it result in the separation of the topcoat from the regenerated cellulose film. These new films, when treated according to the process to be hereinafter set forth, will have greater application as wrapping materials, particularly when used for the purpose of packaging moist foods such as fish, cheese, frozen foods, and the like.

The ammonia halohydrin resin to be used in the practice of the process of this invention should be a thermosetting or cross-linked type of resin and can be prepared by reacting one mol of ammonia with 0.5 up to 5 mols of the halohydrin. The preferred mol ratio of ammonia to halohydrin is 1.0:1.5 to 1.0:3.0 respectively. The resin can then be dispersed in an aqueous solution containing a softening agent or plasticizing agent such as glycerol, and said resin solution can be diluted to a concentration of 0.1% of the ammonia halohydrin resin in solution without diminishing the effectiveness of the treatment of the films according to the process. This renders the process a most economical one to practice and yet the results are so unexpectedly good that it is advantageous to use this process in bonding topcoats to the regenerated cellulose base from both standpoints; namely, economy and effectiveness. The application of these resins as bonding agents may be extended to a variety of nonfibrous regenerated cellulosic films. The resins may be applied to such materials as regenerated cellulose films prepared from solutions of cellulose xanthate, cuproammonium cellulose, cellulose nitrate, cellulose acetate and the like.

In order that there may be a complete understanding of this invention, the following examples are set forth by way of illustration. These are not to be interpreted as limitations in the case except as indicated by the appended claims.

Example 1

A wet, reswollen, regenerated cellulose film is immersed in a solution containing .3% by weight of ammonia-epichlorohydrin resin (prepared by reacting one mol of ammonia with one mol epichlorohydrin), said solution containing a plasticizing agent. The film is allowed to remain in the aqueous resin dispersion for about 5 minutes, whereupon it is removed and dried. The affixed resin is thereby partially cured and finally coated with a moisture-resisting lacquer and immersed in water for testing purposes. After seven days immersion, the coating was still securely bonded to the regenerated cellulose film.

Example 2

An aqueous dispersion of ammonia alpha-dichlorohydrin resin (mol ratio 1.0:1.5) is prepared by dispersing 0.1% of the resin in water. The percentage of the resin used is based on the total weight of the solution. To this solution is added about 8% by weight of diethylene glycol. A nonfibrous cellulosic film is then immersed in the bath for about 5 minutes, whereupon it is removed and dried, and the topcoat applied. This film is then subjected to a coating adhesion test by immersion in water for an extended period of time. After a prolonged immersion, there is no sloughing of the topcoat.

Example 3

An aqueous resin solution is prepared by dispersing 0.5% of ammonia-epibromohydrin resin (mol ratio 1:2.5) in water. The percentage of the resin in the aqueous dispersion is based on the total weight of the dispersion. These nonfibrous cellulosic films are immersed in the aqueous resin dispersion and allowed to remain for about 5 minutes, after which time they are removed from the solution and dried for about 10 minutes at 200° F. This permits the resin to become partially cured. The topcoat is then applied to the film. The films are then subjected to a coating adhesion test by immersion in water. After a prolonged period of time, the topcoat was still firmly anchored to the film base. This indicates that the adhesion of the topcoat to the film is firmly secured by the use of this anchoring agent.

Example 4

An aqueous resin solution comprising 1% of ammonia-α-dibromohydrin resin (mol ratio 1:2.0), the percentage being based on the total weight of the solution, is prepared. To the solution is added about 8% by weight of ethylene glycol, the percentage being based on the total weight of the solution. A non-fibrous cellulosic film is immersed in the solution for about 5 minutes. It is then removed and dried for about a ten-minute period, at a temperature of about 200° F. This drying step enables the resin to become partially cured. The films are then coated with the topcoat, and subjected to a coating adhesion test. After a prolonged immersion, the topcoat is still firmly anchored to the cellulose base.

We have discovered that these ammonia halohydrin resins when used in the treatment of non-fibrous cellulose films are virtually colorless.

This factor makes them desirable for use in many applications. Most resins that have been tried for this purpose which also have this desirable lack of coloration are generally catalyzed by acids. On the other hand, resins for the most part that are catalyzed by alkaline conditions are too discolored for use in clear, regenerated cellulose films. The applicants have discovered that these ammonia halohydrin resins are particularly desirable for use as bonding agents in the treatment of regenerated cellulosic films, not only because of their excellent bonding performance, but also because they are virtually colorless and they can be catalyzed under alkaline conditions.

The difunctional halohydrins which are used in the preparation of these resins are derivatives of glycerols or glycols in which a terminal hydroxy group has been substituted by a halogen atom; that is, by chlorine, iodine, bromine, or fluorine.

By the use of the term halohydrin, we include the epihalohydrins and the dihalohydrins. Amongst the epihalohydrins which can be utilized with ammonia to form the reaction product for use in this process we include epichlorohydrin, epibromohydrin, epiiodohydrin, and the like. Amongst the dihalohydrins which can be used with the ammonia to form the resin to be utilized in the practice of the process of the invention, we include such compounds as dichlorohydrin, dibromohydrin, and diiodohydrin, and the like. The halohydrins which are particularly adaptable for use in the preparation of these resins are those which are referred to as difunctional halohydrins. By a difunctional compound we means a compound in which there are two reactive groups which are capable of interacting with other difunctional compounds to form thermosetting resins with a cross-linked structure.

Reference is herein made to our copending application which has the Serial No. 101,915, and was filed on June 28, 1949. In that application, we have shown the use of the aliphatic polyamine-difunctional halohydrin resins in aqueous dispersion for treating non-fibrous regenerated cellulosic films, for the purpose of improving the bonding of the subsequently-applied topcoats to said cellulose films.

In the preparation of the non-fibrous cellulose film for the treatment with the resin dispersion, it is preferable that the films be subjected to treatment in an aqueous bath, in order that the films may become wet and reswollen. The films are then immersed in the aqueous resin plasticizer dispersion. The regenerated cellulose film is dried after the immersion in the resin plasticizing bath. This drying step results in the partial curing of the affixed resin, so that when the topcoat is subsequently applied, it is so firmly anchored to the base, that it does not readily slough, even after prolonged immersion in water.

In the practice of the process of this invention, it is possible to vary the actual procedure of the treatment of the regenerated cellulose film in many different ways. For instance, one may immerse the non-fibrous regenerated cellulosic film in an aqueous dispersion of the resin, remove the film from the dispersion, and subject it to treatment in a plasticizing bath, prior to the drying and partial curing. Alternatively, one may incorporate the plasticizing agent into the aqueous dispersion of the resin, so that the treatment of the film may be consummated in one operation. A further modification of the process generally, may be accomplished by immersing the film in the resin solution, drying the film, and then washing the film and subsequently immersing it into the plasticizing or softening bath, finally drying it and applying the topcoat. A still further modification may be accomplished by immersing the film in the aqueous resin dispersion, removing the film, drying the film, and applying the topcoat. When the process is practiced without the plasticizing agent, good bonding results, but it is preferred to make use of a plasticizing agent. Each of these modifications of the process per se and other modifications obvious to those skilled in the art is within the intended scope of this invention.

As plasticizing agents, one may make use of such compounds as water soluble polyhydric alcohols, the ureas, and the like, in aqueous solution. The use of polyhydric alcohols in solution, as plasticizing agents, need not be limited to those alcohols that have more than two hydroxy groups; but should include the dihydric alcohols as well, such as ethylene glycol, diethylene glycol, glycerol, trimethylene glycol, and the like. The amount of the polyhydric alcohol in the aqueous softening bath may be varied widely, but, in the interest of economy, an 8% solution of the polyhydric alcohol in water is as efficacious as those of even greater concentrations. However, the minimum percentage of the polyhydric alcohol in the softening bath should not be appreciably less than about 2% for best results. By increasing the concentration of the polyhydric alcohol in the softening bath resin-containing solution, no appreciable difference in result is to be observed, even when the concentration of the polyhydric alcohol is increased to double that previously indicated. Sixteen percent (16%) solutions of the polyhydric alcohol, together with .05% of the ammonia halohydrin resin, produce no appreciable result over a comparable solution which contained only 8% of the polyhydric alcohol. It must be remembered, however, that the use of the ammonia halohydrin resins as bonding agents for the treatment of the non-fibrous regenerated cellulosic film can best be accomplished by the use of a plasticizing agent.

Amongst the coating compositions which can be used in the final treatment of the cellulosic films, are those containing as the film forming constituent nitrocellulose, cellulose acetate, methyl cellulose, deacetylated chitin, ethyl cellulose, butyl methacrylate, rubber, chlorinated rubber, moisture resisting lacquers, waxes such as montan wax, beeswax, carnauba wax, and other conventional film forming coating materials.

From an economic standpoint, it is advisable to use these resins in solutions in percentages varying between 0.1% and 3.0%. Naturally, concentrations above 3% may be used, but it is to be remembered that, from an economical standpoint, the effectiveness of the anchoring of the topcoat to the film is comparable with the lower concentrations as with the higher concentrations. Concentrations of resin solids in solution up to 10% or even higher may be used, but in the use of these high solids resin solutions, the tendency toward gelation is much greater.

It is very often desirable and sometimes necessary to apply to cellulosic and regenerated cellulosic materials some form of bonding or anchoring agent which will serve as a medium by which subsequently-applied coatings, printings, adhesives, or other surface treatments, can be more securely bonded to such base materials. Ammonia difunctional halohydrin cationic resins provide a convenient, efficient means for achieving any one or all of these results.

We have discovered that thermosetting resins such as the ammonia halohydrin cationic resins produce very satisfactory results when used as bonding agents in the treatment of non-fibrous cellulosic materials prior to the subsequent application of the topcoat. In the preparation of the resins to be used in accordance with the processes of this invention, the ammonia may be reacted with the bifunctional halohydrins in molar proportions varying between 0.5:1 to 5:1 halohydrin to ammonia respectively. The following examples, in which all parts are parts by weight, will serve to illustrate in greater detail the actual preparation of the resins per se but it is to be remembered that these examples are by way of illustration only and are not to be interpreted as a limitation on the case except as indicated by the appended claims.

*Example 6*

Sixty-five (65) parts of an aqueous ammonia solution (27% NH₃) are charged into a suitable reaction vessel. 186 parts of epichlorohydrin are added gradually thereto dropwise. The exothermic reaction is controlled at about 30–40° C., thereafter the mixture is heated on a steam bath for 1 to 2 hours. The reaction mixture is then cooled to 15–20° C. and 60 parts of a 50% solution of sodium hydroxide are added and allowed to stand for 15 minutes. The reaction mixture is then diluted to the desired solids content by the addition of the required amount of water. Prior to use in the treatment of the regenerated cellulose, the aqueous resin solution should be neutralized with hydrochloric acid to approximate neutrality.

*Example 7*

Introduce into a reaction vessel 65 parts of a 27% aqueous ammonia solution and 240 parts of a 50% sodium hydroxide solution and add gradually thereto 387 parts of dichlorohydrin. The exothermic reaction which develops should be controlled at about 35–40° C. until said reaction is substantially completed. Then heat the reaction mixture on a steam bath for about 1 to 2 hours. Remove the reaction mixture from the steam bath and cool the mixture to about 15–20° C. Add another 240 parts of a 50% solution of sodium hydroxide and leave standing for about 15 minutes. Then dilute the reaction mixture to the desired solids content by the addition of the required amount of water. Again, the aqueous resin solution should be neutralized with an acid material such as hydrochloric acid to approximate neutrality prior to the use of the resin in the regenerated cellulose.

We claim:

1. A process for treating non-fibrous cellulose film to improve the anchorage of said film to a subsequently-applied topcoat which comprises the steps of immersing said cellulose film in an aqueous dispersion of an ammonia difunctional halohydrin thermosetting cationic resin, removing the film, drying the film, thereby partially curing the affixed resin and applying a topcoat thereto.

2. A process for treating non-fibrous cellulose film to improve the anchorage of said film to a subsequently-applied topcoat which comprises the steps of immersing said cellulosic film in an aqueous dispersion of an ammonia difunctional halohydrin thermosetting cationic resin, removing the film, subjecting it to treatment in a plasticizing bath, drying the film, thereby partially curing the affixed resin and applying a topcoat thereto.

3. A process for treating non-fibrous cellulose film to improve the anchoring of said film to a subsequently-applied topcoat which comprises the steps of immersing said cellulose film in an aqueous dispersion of an ammonia di-functional halohydrin thermosetting cationic resin in a plasticizing bath, removing the film, drying the film, thereby partially curing the affixed resin, and applying a topcoat thereto.

4. A process for treating regenerated cellulosic film to improve the anchoring of said film to a subsequently-applied topcoat which comprises the steps of immersing said cellulosic film in an aqueous dispersion of an ammonia epihalohydrin thermosetting cationic resin in a plasticizing bath, removing said film, drying the film, thereby partially curing the affixed resin, and applying a topcoat thereto.

5. A process for treating non-fibrous cellulose film to improve the anchoring of said film to a subsequently-applied topcoat which comprises the steps of immersing said cellulose film in an aqueous dispersion of an ammonia-dihalohydrin thermosetting cationic resin in a plasticizing bath, removing the film, drying the film, thereby partially curing the affixed resin, and applying the topcoat thereto.

6. A process for treating non-fibrous cellulose film to improve the anchoring of said film to a subsequently-applied topcoat which comprises the steps of immersing said cellulose film in an aqueous dispersion of ammonia-epichlorohydrin thermosetting cationic resin in a plasticizing bath, removing the film, drying the film, thereby partially curing the affixed resin, and applying the topcoat thereto.

7. A process for treating regenerated cellulose film to improve the anchoring of said film to a subsequently-applied topcoat which comprises the steps of immersing said cellulose film in an aqueous dispersion of a thermosetting ammonia-dichlorohydrin resin in a plasticizing bath, removing the film, drying the film, thereby partially curing the affixed resin, and applying the topcoat thereto.

8. A process for treating non-fibrous cellulose film to improve the anchoring of said film to a subsequently-applied topcoat which comprises the steps of immersing said cellulose film in an aqueous dispersion of an ammonia halohydrin thermosetting cationic resin containing from 0.1% to 3% of said resin in a plasticizing bath, removing the film, drying the film, thereby partially curing the affixed resin, and applying the topcoat thereto.

9. A process for treating regenerated cellulose film to improve the anchoring of said film to a subsequently-applied topcoat which comprises the steps of immersing said cellulosic film in an aqueous dispersion of an ammonia epihalohydrin thermosetting cationic resin containing from .1% to 3% of said resin in a plasticizing bath, removing said film, drying the film, thereby partially curing the affixed resin, and applying the topcoat thereto.

10. A process for treating non-fibrous cellulose film to improve the anchoring of said film to a subsequently-applied topcoat which comprises the steps of immersing said cellulose film in an aqueous dispersion of an ammonia dihalohydrin thermosetting cationic resin containing from .1% to 3% of said resin in a plasticizing bath, removing the film, drying the film, thereby partially curing the affixed resin, and applying the topcoat thereto.

11. A process for treating non-fibrous cellulose film to improve the anchoring of said film to a subsequently-applied topcoat which comprises the steps of immersing said cellulose film in an aqueous dispersion of ammonia-epichlorohydrin thermosetting cationic resin containing from .1% to 3% of said resin in a plasticizing bath, removing the film, drying the film, thereby partially curing the affixed resin, and applying the topcoat thereto.

12. A process for treating regenerated cellulose film to improve the anchoring of said film to a subsequently-applied topcoat which comprises the steps of immersing said cellulose film in an aqueous dispersion of a thermosetting ammonia dichlorohydrin resin containing from .1% to 3% of said resin in a plasticizing bath, removing said film, drying the film, thereby partially curing the affixed resin, and applying the topcoat thereto.

13. A non-fibrous cellulosic film impregnated with a thermosetting cationic ammonia-difunctional halohydrin resin and coated with a water-repellent topcoat wherein said resin is partially cured.

14. The product in claim 13 in which the resin is a cationic ammonia-epichlorohydrin resin.

15. The product of claim 13 in which the resin is ammonia-dichlorohydrin.

JOHN HAROLD DANIEL, Jr.
CHESTER GREY LANDES.
JOHN DAVIS POLLARD.

REFERENCES CITED

The following references are of record in the file of this patent:

UNITED STATES PATENTS

| Number | Name | Date |
| --- | --- | --- |
| 1,977,251 | Stallmann | Oct. 16, 1934 |
| 2,104,092 | Munz et al. | Jan. 4, 1938 |
| 2,280,829 | Jebens | Apr. 28, 1942 |
| 2,394,009 | Pollard | Feb. 5, 1946 |